Patented June 11, 1940

2,204,210

UNITED STATES PATENT OFFICE 2,204,210

PREPARATION OF SECONDARY ALKYL SULPHONIC ACIDS

Mark Wendell Farlow, Wilmington, Del., assignor to E. I. du Pont de Nemours & Company, Wilmington, Del., a corporation of Delaware No Drawing. Application December 15, 1938, Serial No. 245,909

7 Claims. (Cl. 260—513)

This invention relates to processes for the preparation of water-soluble secondary alkyl monosulphonates. More specifically, this invention pertains to processes for the manufacture of secondary alkyl monosulphonic acids by the oxidation of higher secondary dialkyl disulphides or mixtures of higher secondary dialkyl disulphides with higher secondary alkyl thiols.

This invention has as an object the development of a more practical process for the manufacture of the higher secondary alkyl monosulphonates. Other objects will appear hereinafter.

These objects are accomplished by the following invention which pertains to the manufacture of secondary alkyl monosulphonic acids having the general formula:

in which R and R' represent saturated aliphatic hydrocarbon radicals and the group R—C—R' contains at least 10 carbon atoms in a straight chain by oxidizing secondary dialkyl disulphides having the general formula:

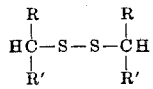

in which R and R' represent saturated aliphatic hydrocarbon radicals and the groups R—C—R' contain at least 10 carbon atoms in a straight chain.

The following examples illustrate but do not limit the invention. All parts are given by weight.

Example I

*Oxidation of dipentadecyl-8-disulphide*

Twenty parts of dipentadecyl-8-disulphide was added slowly to 45 parts of 70% nitric acid heated to 60° C. and stirred in a round-bottom glass vessel. After all the disulphide was added, the temperature was raised to 90° C. to drive off the brown fumes. About 75 parts of water was added to the reaction mixture, which was then stirred and warmed on the steam bath to form a strongly foaming solution. The reaction mixture, containing the 8-pentadecane sulphonic acid, was next neutralized with 10% aqueous sodium hydroxide solution, and extracted several times with diethyl ether. The ether extract was dried over potassium carbonate, filtered and the ether evaporated. Twenty-five parts of an orange colored wax was obtained after drying in a vacuum dessicator to constant weight which analyzed 8.92% sulphur. The theoretical sulphur content for $C_{15}H_{31}SO_3Na \cdot 3H_2O$ is 8.94%. The product was an excellent wetting agent when tested by the method of Draves and Clarkson (American Dyestuffs Reporter 20, 201 (1931)).

Example II

*Oxidation of a mixture of 8-pentadecanethiol and dipentadecyl-8-disulphide*

Twenty parts of a mixture which contains approximately equal quantities of dipentadecyl-8-disulphide and 8-pentadecanethiol is added slowly to 45 parts of 70% nitric acid heated to about 60° C. and stirred in a glass lined vessel. It requires about 35 minutes to add the mixture of sulphur compounds to the nitric acid. After all the disulphide-thiol mixture is added, the reaction mixture is heated on the steam bath to drive off the brown fumes. The resulting viscous solution is diluted with water and neutralized with aqueous sodium hydroxide solution. The resulting clear solution foams strongly and when diluted with distilled water to a concentration of about 0.2 g./l. gives a surface-active solution which wets powdered sulphur very rapidly.

Example III

*Oxidation of di-heptadecyl-9-disulphide*

Two hundred seventy-two parts of 9-heptadecanethiol is dissolved in about 1000 parts of ethyl alcohol and a solution of iodine in ethyl alcohol is added until no more oil precipitates and the color of iodine is permanent. The lower disulphide layer is separated and washed with water. The diheptadecyl-9-disulphide is added slowly to 540 parts of concentrated nitric acid of specific gravity 1.42 which is heated to 60–70° C. and stirred in a glass vessel equipped with a stirrer, thermometer and dropping funnel. After all the disulphide is added, the reaction mixture is heated on the steam bath until brown fumes are no longer given off. The reaction mixture is diluted with water and neutralized with aqueous sodium hydroxide solution. The aqueous solution of sodium 9-heptadecanesulphonate is an excellent wetting agent for cotton textiles.

Example IV

*Oxidation of di-(3,9-diethyltridecyl-6)-disulphide*

3,9-diethyl-6-tridecanethiol is oxidized to the corresponding disulphide by means of sulphuric acid. The resulting disulphide is next oxidized with 70% nitric acid in the same manner as described in Example III. After neutralizing the acid solution with a dilute aqueous solution of sodium hydroxide, the aqueous solution is extracted with diethyl ether, dried with sodium sulphate, filtered and the ether evaporated. Sodium 3,9-diethyl-6-tridecanesulphonate is obtained as a soft wax.

EXAMPLE V

*Oxidation of a mixture of 5,11-diethyl-8-pentadecanethiol and di-(5,11-diethyl-pentadecyl-8)-disulphide*

One hundred twenty-eight parts of nitric acid of specific gravity 1.42 is placed in a flask equipped with a stirrer, thermometer and dropping funnel. The acid is heated to about 60-70° C. and a mixture comprising 40 parts of di(5,11-diethyl-pentadecyl-8) disulphide and 10 parts of 5,11-diethyl-8-pentadecanethiol is added slowly from the dropping funnel. After all the thiol-disulphide mixture is added and the vigorous evolution of fumes of nitrogen oxides has ceased, the reaction mixture is heated on the steam bath until all the brown fumes are dispelled. It is then diluted with water and neutralized with aqueous sodium hydroxide solution. The resulting aqueous solution may be used as a wetting agent.

EXAMPLE VI

*Oxidation of a mixture of dipentadecyl-8-disulphide, diheptadecyl-9-disulphide and di-nonadecyl-10-disulphide*

A mixture comprising 15 parts of dipentadecyl-8-disulphide, 10 parts of diheptadecyl-9-disulphide and 5 parts of dinonadecyl-10-disulphide is added slowly to 60 parts of 70% nitric acid, heated to about 65° C. and stirred in a round bottom glass vessel. After all of the disulphide mixture is added, the reaction mixture is heated on the steam bath until brown fumes are no longer given off. The reaction mixture is next diluted with water and neutralized with aqueous potassium hydroxide solution. The resulting solution contains a mixture of the potassium salts of 8-pentadecanesulphonic acid, 9-heptadecanesulphonic acid, and 10-nonadecanesulphonic acid.

As intermediates for oxidation to sulphonic acids I may employ the disulphides which are readily obtained under mild conditions of oxidation from the following mercaptans: 8-pentadecanethiol, 7-pentadecanethiol, 6-pentadecanethiol, 5-pentadecanethiol, 4-pentadecanethiol, 3-pentadecanethiol, 7-tridecanethiol, 6-dodecanethiol, 7-ethyl-2-methyl-4-undecanethiol, 3,9-diethyl-6-undecanethiol, 3-ethyl-6-decanethiol, 3-ethyl-6-undecanethiol, 6-undecanethiol, 4-undecanethiol, 2-methyl-5-undecanethiol, 9-heptadecanethiol, 6-heptadecanethiol, 8-heptadecanethiol, 7-heptadecanethiol, 5-heptadecanethiol, 4-heptadecanethiol, 3-heptadecanethiol, 5-ethyl-6-pentadecanethiol, 3-ethyl-4-pentadecanethiol, 3,9-diethyl-6-tridecanethiol, 5-ethyl-8-pentadecanethiol, 2,4,10,12-tetramethyl-7-tridecanethiol, 3-ethyl-6-pentadecanethiol, 2-methyl-5-hexadecanethiol, 3,7-dimethyl-10-pentadecanethiol, 10-nonadecanethiol, 9-nonadecanethiol, 8-nonadecanethiol, 7-nonadecanethiol, 6-nonadecanethiol, 5-nonadecanethiol, 4-nonadecanethiol 3-nonadecanethiol, 2-nonadecanethiol, 5,11-diethyl-8-pentadecanethiol, 5-ethyl-8-heptadecanethiol, 5-ethyl-6-heptadecanethiol, 2-methyl-5-octadecanethiol, 2,6-dimethyl-10-heptadecanethiol, 2,6-dimethyl-13-ethyl-10-pentadecanethiol, 2,6,10,14-tetramethyl-8-pentadecanethiol, 11-heneicosanethiol, 12-tricosanethiol, 13-pentacosanethiol, 14-heptacosanethiol, 15-nonacosanethiol, 16-hentriacontanethiol, 18-pentatriacontanethiol, etc. I may also employ for oxidation any mixture of the above mentioned secondary dialkyl disulphides or any mixture of secondary dialkyl disulphides derived from secondary alkyl thiols containing at least 10 carbon atoms or a mixture of the above mentioned secondary dialkyl disulphides with the above mentioned secondary alkyl thiols.

Nitric acid is the preferred oxidizing agent for oxidizing the dialkyl disulphides mentioned above to secondary alkyl sulphonic acids. I may also employ other vigorous oxidizing agents such as chromic acid anhydride or potassium permanganate to accomplish this result. Under certain conditions and particularly at elevated temperatures sulphonic acids are formed when the oxidation is carried out with free halogens, hypohalogenous acids and their salts such as sodium hypochlorite, potassium chlorate, sodium chlorate in the presence of traces of osmium tetroxide, perchloric acid, iodic acid, hydrogen peroxide and its organic or inorganic derivatives as for example peracetic acid, benzoyl peroxide, persulphuric acid, chromic acid, sodium chromate, potassium dichromate, particularly in acid solution, etc. I may, if desired, also employ electrolytic oxidation for converting the disulphides to sulphonic acids.

In carrying out the oxidation of the dialkyl disulphides with nitric acid, it is frequently desirable to employ an inert solvent such as carbon tetrachloride, trichloroethylene, etc. It is sometimes necessary to initiate the reaction by the addition of a small amount of fuming nitric acid and warming to about 50-75° C. Reaction is indicated by the vigorous evolution of fumes of the oxides of nitrogen. It is frequently desirable to oxidize a small amount of the dialkyl disulphide with a small amount of nitric acid and then after reaction has started to add additional quantities of the dialkyl disulphide and nitric acid slowly to the reaction mixture. While temperatures ranging from 0° C. to 100° C. have been used for the nitric acid oxidation, I may carry out the reaction below 0° C. and above 100° C. However, I prefer to use temperatures of about 40-75° C. At low temperatures the reaction becomes sluggish while at high temperatures, the reaction is difficult to control. A sufficiently high temperature to maintain the dialkyl disulphide in its liquid state is desirable for a readily controlled oxidation.

The secondary alkyl monosulphonic acids described herein may be used as such, but generally they are converted to their alkali metal salts by neutralization with an alkali metal hydroxide such as sodium hydroxide. The potassium, ammonium, calcium, and magnesium salts may also be prepared and used. Suitable salts of secondary alkyl sulphonic acids described herein may also be made from such amines as dimethylamine, ethylamine, monoethanolamine, diethanolamine, triethanolamine, butylamine, glucamine, methylglucamine, pyridine, piperidine, cyclohexylamine, aniline, toluidine, etc. In this application when I mention a secondary alkyl monosulphonate I intend to refer generically to the sulphonate irrespective of how or whether the acid hydrogen of the sulphonic group may have been neutralized.

The secondary alkyl monosulphonates described in this case belong to the class of surface-active or capillary-active materials in that they have colloidal properties and may therefore be advantageously used in any process involving wetting, penetrating, deterging, dispersing, emulsifying, frothing, foaming, and kindred phenomena and therefore they may be utilized in many of the technical applications of surface-active agents which are described in Downing and Johnson application Serial No. 200,530, filed April 6, 1938.

The above description and examples are intended to be illustrative only and not to limit the scope of the invention. Any departure therefrom which conforms to the spirit of the invention is intended to be included within the scope of the appended claims.

I claim:

1. A process of making secondary alkyl monosulphonic acids having the general formula:

in which R and R' each denotes a saturated aliphatic hydrocarbon radical and the group R—C—R' contains at least 10 carbon atoms in a straight chain which comprises oxidizing secondary dialkyl disulphides having the general formula:

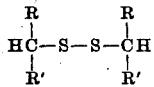

in which R and R' each denotes a saturated aliphatic hydrocarbon radical and each of the groups R—C—R' contains at least 10 carbon atoms in a straight chain.

2. A process according to claim 1 in which the secondary dialkyl disulphides are oxidized to secondary alkyl monosulphonic acids with nitric acid.

3. A process of making secondary alkyl monosulphonic acids having the general formula:

in which R and R' each denotes a saturated aliphatic hydrocarbon radical containing at least 2 carbon atoms and the group R—C—R' contains from 15 to 19 carbon atoms, at least 10 carbon atoms in this group being in a straight chain, which comprises oxidizing secondary dialkyl disulphides having the general formula:

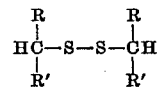

in which R and R' each denotes a saturated aliphatic hydrocarbon radical containing at least 2 carbon atoms and each of the groups R—C—R' contains from 15 to 19 carbon atoms, at least 10 carbon atoms in each of these groups being in a straight chain.

4. A process according to claim 3 wherein nitric acid is used to oxidize the secondary dialkyl disulphide.

5. A process for producing 8-pentadecane sulphonic acid which comprises oxidizing dipentadecyl-8-disulphide with nitric acid.

6. A process for producing 7-heptadecane sulphonic acid which comprises oxidizing diheptadecyl-7-disulphide.

7. A process for producing 3,9-diethyl-6-tridecane sulphonic acid which comprises oxidizing di-(3,9-diethyltridecyl-6)-disulphide.

MARK WENDELL FARLOW.